Figure 1:
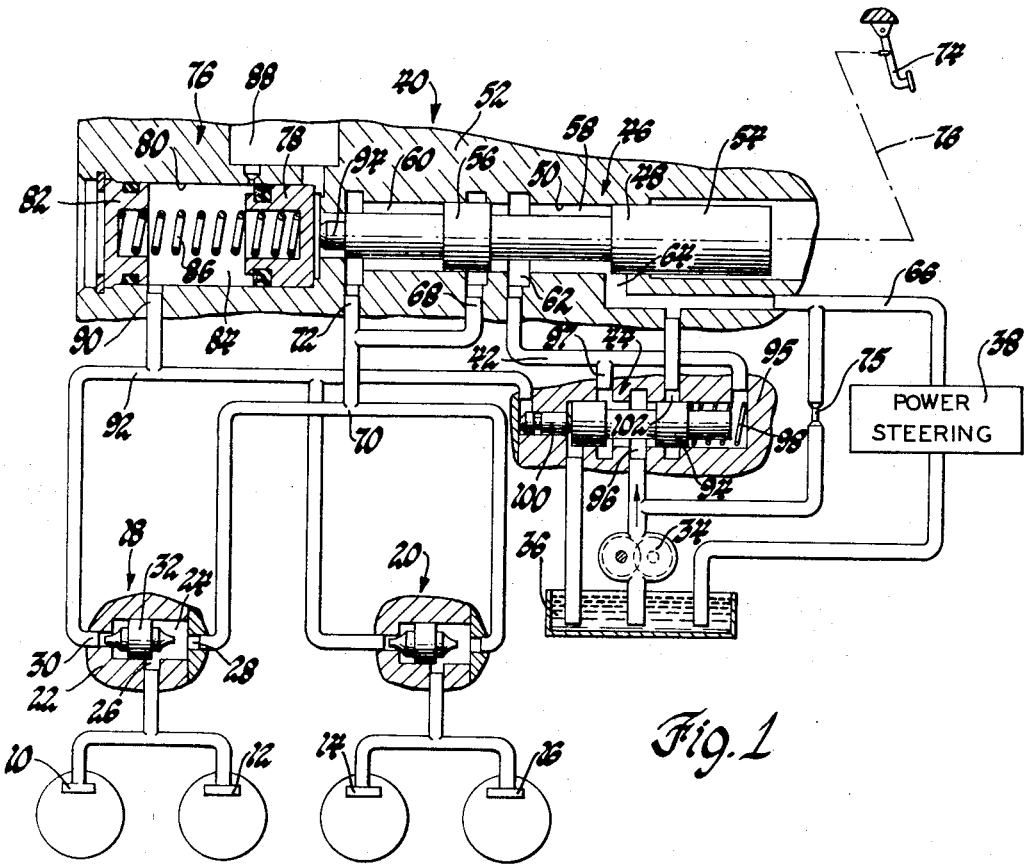

United States Patent [19]
Koivunen

[11] 3,727,986
[45] Apr. 17, 1973

[54] DIRECT APPLY BRAKE SYSTEM
[75] Inventor: Erkki A. Koivunen, Livonia, Mich.
[73] Assignee: General Motors Corporation, Detroit, Mich.
[22] Filed: Dec. 22, 1971
[21] Appl. No.: 210,666

[52] U.S. Cl. .................... 303/2, 60/52 B, 60/54.6 P, 188/359, 303/10
[51] Int. Cl. ............................................. B60t 11/20
[58] Field of Search .................... 188/359, 151 A; 303/6, 2, 13, 10; 60/54.5 P, 54.6 P, 52 B

[56] References Cited

UNITED STATES PATENTS

| | | | |
|---|---|---|---|
| 2,848,877 | 8/1958 | Stelzer | 188/359 X |
| 3,514,163 | 5/1970 | MacDuff | 60/52 B X |

Primary Examiner—Milton Buchler
Assistant Examiner—John J. McLaughlin
Attorney—Warren E. Finken et al.

[57] ABSTRACT

A direct apply brake system includes a control valve which when actuated applies fluid from a central hydraulic source directly to a wheel brake. A master cylinder is mounted in tandem with the direct apply brake control valve and actuated upon over-travel of the valve subsequent to loss of reaction pressure acting on the valve, thereby providing a back-up pressure source. Shuttle valves associated with the wheel brakes selectively connect the brakes to the brake control valve or the master cylinder, whichever is in operation. A shut-off valve blocks communication of the central hydraulic fluid to the brake control valve when the master cylinder is actuated to prevent loss of such fluid in the event of a fluid leak in the direct apply system.

3 Claims, 2 Drawing Figures

PATENTED APR 17 1973 3,727,986

INVENTOR.
Erkki A. Koivunen
BY D. D. McGraw
ATTORNEY

DIRECT APPLY BRAKE SYSTEM

The invention relates to a direct apply brake system and more particularly to a direct apply brake system having a master cylinder as a back-up pressure source and a shut-off valve to prevent loss of hydraulic fluid in the event of a line rupture or leak.

It is known in automotive vehicles to utilize a single source of hydraulic fluid for operation of the brake system as well as other fluid power operated vehicle systems such as the power steering system.

It is also known to apply the brakes directly with the central hydraulic system fluid by providing a brake control valve which upon actuation channels such fluid directly to the wheel brakes without the interposition of a master cylinder.

A common shortcoming of such brake apply systems is the loss of brake apply capability upon failure of the central hydraulic source. Furthermore, should a rupture or leak occur in the considerable length of fluid conduit extending from the central hydraulic source of the wheel cylinders, the central hydraulic fluid may be completely lost through such a rupture and the operation of the other fluid power operated systems impaired.

One feature of the present invention is the provision of a master cylinder mounted in tandem with the brake control valve and actuated thereby upon over-travel when the central hydraulic pressure is lost.

Another feature of the invention is the provision of pressure responsive shuttle valves associated with the wheel brakes to selectively establish fluid communication with the brake control valve or the master cylinder system, whichever is in operation.

Another feature of the invention is the provision of a shut-off valve adapted to block communication of central hydraulic fluid to the brake control valve in response to operation of the master cylinder system.

In general the invention includes a central hydraulic source providing hydraulic fluid to an operator actuable brake control valve which when actuated channels the central hydraulic fluid to the wheel brake. The brake apply pressure also acts on the end of the brake apply valve to provide a reaction force thereon. Upon loss of hydraulic pressure due to a failure of the central hydraulic source or a rupture in the line the reaction force is lost and the brake apply valve travels past its normal limit of travel. A master cylinder mounted in tandem with the brake control valve is actuated upon such over-travel. A pressure responsive shuttle valve located close to the wheel brake selectively connects the wheel brake with the brake control valve or the master cylinder, whichever is communicating the greater fluid pressure thereto. A shut-off valve is located intermediate the central hydraulic source and the brake control valve and is normally open to communicate the central hydraulic fluid to the brake control valve. The shut-off valve is operated by the master cylinder pressure to block communication of the central hydraulic fluid to the direct apply valve whenever the master cylinder is actuated, thereby preventing loss of the central hydraulic fluid if there has been a line rupture.

Figure 2:
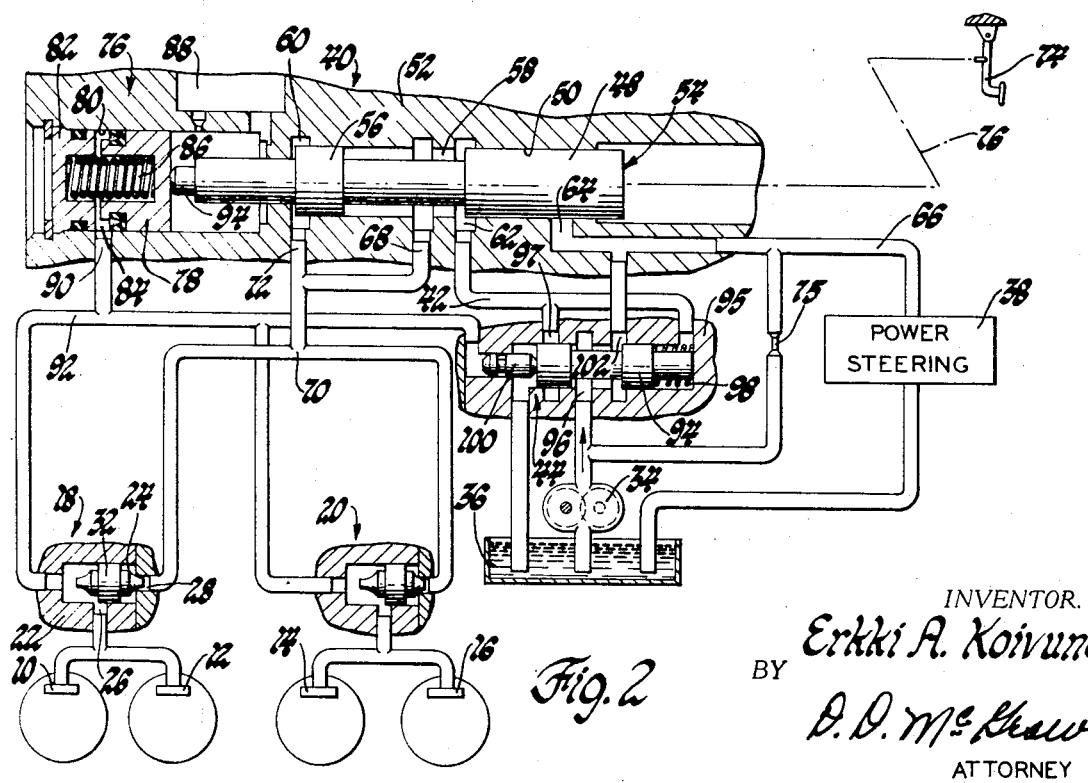

These and other features, objects, and advantages of the invention will be apparent upon consideration of the following specification and the drawings in which:

FIG. 1 depicts the direct apply brake system in the normal mode of control by the brake control valve; and FIG. 2 shows the direct apply brake system in the master cylinder mode of operation with the shut-off valve operated to prevent loss of central hydraulic fluid.

Referring now to FIG. 1, the motor vehicle includes conventional fluid pressure operated front wheel brakes 10 and 12 and conventional fluid pressure operated rear wheel brakes 14 and 16. Shuttle valves, generally indicated at 18 and 20, are associated respectively with the front and rear wheel brakes. The shuttle valve 18, it being understood that shuttle valve 20 is of identical construction, includes a housing 22 having a valve chamber 24, an outlet port 26 and a pair of inlet ports 28 and 30. A valve member 32 is slidable within the chamber 24 in response to the opposite acting inlet pressures acting thereon to connect the outlet port 26 with the one of the inlet ports 28 or 30 having the greater fluid pressure communicated thereto.

The vehicle also has a central hydraulic system including a pump 34 and reservoir 36 which provide a central source of hydraulic fluid for operation of the power steering system 38 as well as the brake control system 40. The central hydraulic fluid from pump 34 is communicated to a conduit 42 through a shut-off valve indicated generally at 44. It will be sufficient for present purposes to note that the shut-off valve 44 is normally open to pass the central hydraulic fluid to the conduit 42.

The brake control system 40 includes a direct apply brake control valve indicated generally at 46. The direct apply brake control valve 46 includes a valve spool 48 slidable within a bore 50 in a housing 52. Valve spool 48 includes axially spaced lands 54 and 56 which provide within bore 50 annular chambers 58 and 60. An inlet port 62 in housing 52 is connected to conduit 42 and communicates central hydraulic fluid from pump 34 to the annular chamber 58. An outlet port 64 in housing 52 is so positioned in housing 52 that it is connected to annular chamber 58 when the spool 48 is in rest position as shown in FIG. 1. Conduit 66 connects outlet port 64 with the power steering system 38. Thus it is seen that a normal fluid path is established from pump 34 through the direct apply brake control valve 46 and the power steering system 38 to the pump reservoir 36.

An outlet port 68 in housing 52 is so located with respect to land 56 when the valve spool 48 is in the rest position of FIG. 1 that the outlet port 68 is blocked with respect to the inlet port 62. The outlet port 68 is connected via a conduit 70 with inlet ports 28 of the shuttle valves 18 and 20. Housing 52 also has a port 72 connecting the conduit 70 with annular chamber 60.

A brake pedal 74 is connected to the valve spool 48 by a push rod 76 or other suitable means and when actuated by the vehicle operator moves the valve spool 48 leftwardly from its rest position of FIG. 1. Such movement of the valve spool 48 causes land 54 to progressively block output port 64 and land 56 to progressively open output port 68, thereby causing a pressure increase in annular chamber 58 which is communicated through conduit 70 to the shuttle valves 18 and 20 and the annular chamber 60. Communication of this pressure to the shuttle valves 18 and 20 holds the valve members 32 in their leftward positions thereby communicating the brake apply pressure in conduit 70 to the wheel brakes 10, 12, 14, and 16. The brake apply pressure in conduit 70 communicated to annular chamber 60 acts on the end area of land 56 to provide a reaction force on the valve spool 48 which opposes the actuating force applied thereto through the pedal 74. Closure of port 64 blocks communication of the central hydraulic fluid there through to the conduit 66 and connected power steering system 38. An orifice 75 in fluid connection between the pump 34 and power steering system 38 provides a sufficient fluid flow to the power steering system 38 to maintain its operation irrespective of blockage of outlet port 64 by land 54 upon actuation of the direct apply brake control valve 46.

The brake control system 40 also includes a master cylinder assembly indicated generally at 76. A master cylinder piston 78 is slidable in a bore 80 in housing 52 to form in cooperation with a plug 82 a variable volume chamber 84. A spring 86 urges the master cylinder piston 78 to its rest position shown in FIG. 1 in which the chamber 84 is in fluid communication with a reservoir 88. An outlet port 90 in housing 52 communicates with variable volume chamber 84 and is in turn connected with the inlet chambers 30 of shuttle valves 18 and 20 by a conduit 92. A rod 94 on the end of valve spool 48 is engagable with the master cylinder piston 78 for actuation thereof when the valve spool 48 is moved beyond its normal range of movement. Such over-travel of the valve spool 48 occurs upon loss of the brake apply pressure in annular chamber 60 acting on land 56 to provide the reaction force. Such a loss of pressure may result from a failure of the central hydraulic pump 34 or from a rupture or leak in the conduit 42 or 70.

Referring to FIG. 2, the spool 48 is shown in over-travel position consequent to a loss of reaction force. It may be seen that the master cylinder piston 78 has pressurized the fluid in variable volume chamber 84 and that this pressure has been communicated through conduits 92 to the inlet chambers 30 of the shuttle valves 18 and 20. The resultant rightward shifting of valve members 32 connects the master cylinder 76 with the outlet port 26 of the shuttle valves 18 and 20 to thereby apply the wheel brakes irrespective of the loss brake actuating central hydraulic pressure.

Referring again to FIG. 1, the shut-off valve 44 will hereinafter be described in detail. Shut-off valve 44 includes a valve spool 94 slidable in housing 95. A spring 98 acts on spool 94 holding it in its normal position freely communicating central hydraulic fluid from an inlet port 96 connected to pump 34 to an outlet port 97 connected to conduit 42. Conduit 42 communicates the central hydraulic fluid to the rightward end of spool 94 to provide a hydraulic assist to the force of spring 98. A piston 100 is also slidable in housing 96 and abuts the end of spool 94 opposite spring 98. Conduit 92 communicates master cylinder pressure to the piston 100 so that, as shown in FIG. 2, when the master cylinder is actuated subsequent to loss of central hydraulic pressure in conduit 70, the master cylinder pressure in conduit 92 acts upon piston 100 to shift spool 94 rightwardly to block the flow of the central hydraulic fluid to the inlet port 62 of the direct apply brake control valve 46. This rightward shifting of spool 94 connects the inlet port 96 with an outlet port 102 which is connected with conduit 66 to divert the central hydraulic fluid directly to the power steering system 38. Thus it is seen that the central hydraulic fluid will not be lost through a rupture in the direct apply brake system, thereby assuring the continued operation of the power steering system and such other fluid power operated system as may advantageously utilize the central hydraulic source.

Thus it is seen that a direct apply brake control system is provided with a backup master cylinder apply system for actuation of the brakes in the event of failure of the direct apply system. Furthermore, a shut-off valve is provided to prevent the loss of the central hydraulic fluid in the event of a line rupture or leak in the direct apply system.

What is claimed is:

1. In a motor vehicle, the combination comprising:
   a wheel brake adapted for operation by fluid pressure communicated thereto from either first or second fluid pressure sources and including means effective to prevent leakage of pressures from one source to the other;
   a first fluid pressure source for operation of the wheel brake including a pump and control valve means interposed fluidly intermediate the wheel brake and the pump and including operator actuable means adapted to actuate the control valve means to channel pressurized fluid from the pump to the wheel brake, the pressurized fluid also acting on the control valve means to provide a reaction force on the operator actuable means;
   a second fluid pressure source for operation of the wheel brake including a master cylinder means in fluid communication with the wheel brake and mounted in tandem with and engagable by the control valve means to provide a master cylinder pressure upon over-travel of the control valve means in response to loss of reaction force on the operator actuable means;
   and shut-off valve means interposed between the pump and the control valve means normally permitting free fluid communication therebetween, the shut-off valve means being responsive to master cylinder pressure to block fluid communication between the pump and the brake control valve means.

2. A motor vehicle having at least one fluid pressure operated wheel brake, and a pump adapted to provide pressurized fluid for operation of the wheel brake, the combination comprising:
   shuttle valve means having an outlet port fluidly connected with the wheel brake, first and second inlet ports, and a pressure response valve member effective to connect the outlet port with the one of first and second inlet ports having the higher fluid pressure communicated thereto and isolate the outlet port from the other inlet port;
   control valve means interposed between the first inlet port of the shuttle valve means and the pump and including operator actuable means adapted to actuate the control valve means to channel pressurized operating fluid from the pump to the first inlet port, the pressurized fluid also acting on the control valve means to provide a reaction force on the operator actuable means;
   master cylinder means in fluid communication with the second inlet port of the shuttle valve means and mounted in tandem with and engagable by the control valve means to provide a master cylinder pressure upon over-travel of the control valve means permitted by loss of reaction force on the operator actuable means;

and shut-off valve means interposed between the pump and the control valve means and normally permitting free fluid communication therebetween, the shut-off valve means being responsive to master cylinder pressure to block fluid communication between the pump and the brake control valve means.

3. In a motor vehicle, the combination comprising:

a pump providing a source of hydraulic fluid;

wheel brake means operable by either a first or second hydraulic pressure communicated thereto and including means effective to prevent communication of fluid pressure between the first and second pressure sources;

auxiliary fluid pressure operated systems;

a first source of hydraulic pressure including a pump, control valve means receiving hydraulic fluid from the pump and channeling it to the auxiliary fluid pressure operated systems, the control valve means including operator actuable means adapted to actuate the control valve means to channel pressurized fluid to the wheel brake and block communication to the auxiliary fluid pressure operating systems, the pressurized fluid also acting on the control valve means to provide a reaction force on the operator actuable means;

orifice means limitedly communicating hydraulic fluid from the pump to the auxiliary fluid pressure operated systems;

a second source of hydraulic pressure including master cylinder means in fluid communication with the wheel brake and mounted in tandem with and engagable by the control valve means to provide a master cylinder pressure upon over-travel of the control valve means in response to loss of reaction force on the operator actuable means;

and shut-off valve means connected fluidly intermediate the pump and the control valve means and having a valve spool spring biased to a first position permitting fluid communication therebetween and being shifted by master cylinder pressure to a second position blocking fluid communication from the pump to the brake control valve means and opening fluid communication to the auxiliary fluid power systems.

* * * * *